US010209941B2

(12) United States Patent
Yoo et al.

(10) Patent No.: US 10,209,941 B2
(45) Date of Patent: Feb. 19, 2019

(54) MOBILE TERMINAL AND CONTROL METHOD THEREOF

(71) Applicant: LG ELECTRONICS INC., Seoul (KR)

(72) Inventors: Jihyung Yoo, Seoul (KR); Minjae Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 202 days.

(21) Appl. No.: 15/474,756

(22) Filed: Mar. 30, 2017

(65) Prior Publication Data

US 2018/0011674 A1  Jan. 11, 2018

(30) Foreign Application Priority Data

Jul. 6, 2016  (KR) .................. 10-2016-0085729

(51) Int. Cl.
*G06F 3/0481* (2013.01)
*G06F 3/14* (2006.01)
*G06F 3/0482* (2013.01)
*H04N 5/232* (2006.01)
*G06F 3/0484* (2013.01)
(Continued)

(52) U.S. Cl.
CPC .......... *G06F 3/1423* (2013.01); *G05B 15/02* (2013.01); *G06F 3/016* (2013.01); *G06F 3/03547* (2013.01); *G06F 3/0416* (2013.01); *G06F 3/0482* (2013.01); *G06F 3/0488* (2013.01); *G06F 3/04817* (2013.01); *G06F 3/04842* (2013.01); *G06F 3/04886* (2013.01); *G06F 3/1454* (2013.01); *H04N 5/23222* (2013.01); *G06F 2203/0339* (2013.01); *G06F 2203/04105* (2013.01); *G06F 2203/04108* (2013.01); *G09G 2370/042* (2013.01); *G09G 2370/06* (2013.01)

(58) Field of Classification Search
CPC ...... G06F 3/041; G06F 3/1423; G06F 3/1454; G06F 3/0354; G06F 3/0416; G06F 3/04886; G06F 3/0488; G06F 3/04817; G06F 3/04842; G06F 3/0482; H04N 5/23222; G05B 15/02
See application file for complete search history.

(56) References Cited

U.S. PATENT DOCUMENTS

2011/0138416 A1* 6/2011 Kang ................ G06F 3/0482
                                                    725/39
2012/0050183 A1* 3/2012 Lee .................. G06F 3/1423
                                                   345/173
(Continued)

*Primary Examiner* — Alexander Eisen
*Assistant Examiner* — Cory A Almeida
(74) *Attorney, Agent, or Firm* — Lee, Hong, Degerman, Kang & Waimey

(57) ABSTRACT

Provided are a mobile terminal having a plurality of display areas and a control method thereof. The mobile terminal includes a main body having a front surface, a side surface, and a rear surface, a display disposed on the front surface and extending from the front surface to the side surface, a wireless communication unit wirelessly communicating with an external device, and a controller receiving identification information of the external device in response to recognition of the external device, and controlling information output on the touch screen on the basis of the received identification information, wherein, on the basis of the identification information of the external device.

9 Claims, 19 Drawing Sheets

(51) Int. Cl.
*G06F 3/0488* (2013.01)
*G05B 15/02* (2006.01)
*G06F 3/01* (2006.01)
*G06F 3/041* (2006.01)
*G06F 3/0354* (2013.01)

(56) References Cited

U.S. PATENT DOCUMENTS

| | | | |
|---|---|---|---|
| 2013/0041938 A1* | 2/2013 | Lin | G06F 3/0488 709/203 |
| 2014/0096084 A1* | 4/2014 | Kwon | G06F 3/0482 715/835 |
| 2014/0310742 A1* | 10/2014 | Kim | H04N 21/485 725/30 |
| 2015/0015512 A1* | 1/2015 | Kwak | G06F 3/0412 345/173 |
| 2015/0020081 A1* | 1/2015 | Cho | G06F 9/542 719/318 |
| 2015/0346899 A1* | 12/2015 | Jung | G06F 3/0416 345/173 |
| 2016/0062600 A1* | 3/2016 | Kim | G06F 3/04817 715/765 |
| 2016/0063954 A1* | 3/2016 | Ryu | G06F 3/1454 345/589 |

* cited by examiner (a)  (b)  (c)

(a)          (b)

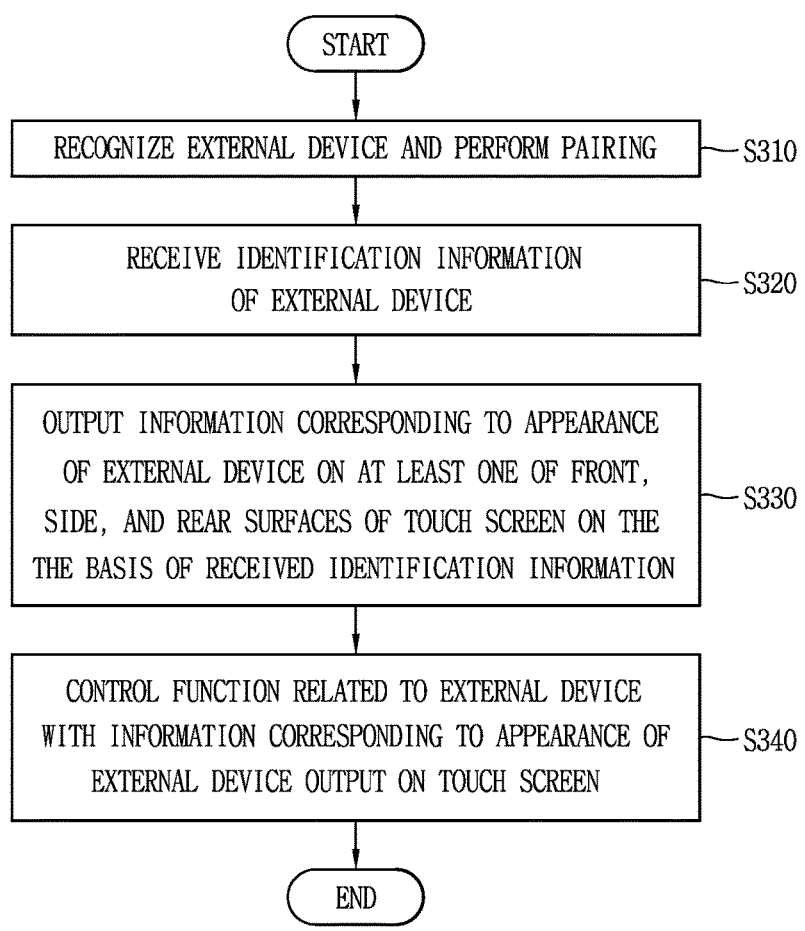

FIG. 4B
(a) 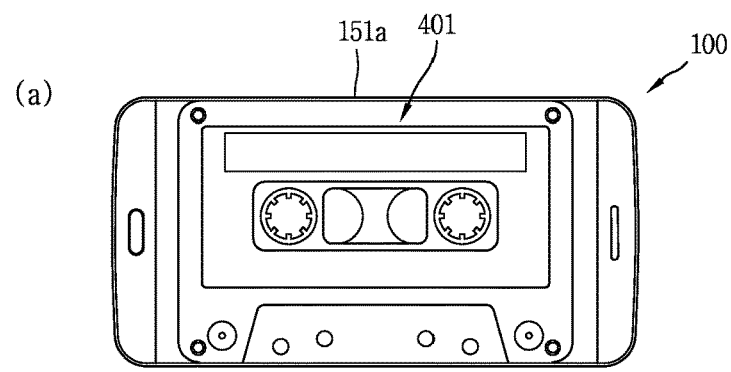
(b) 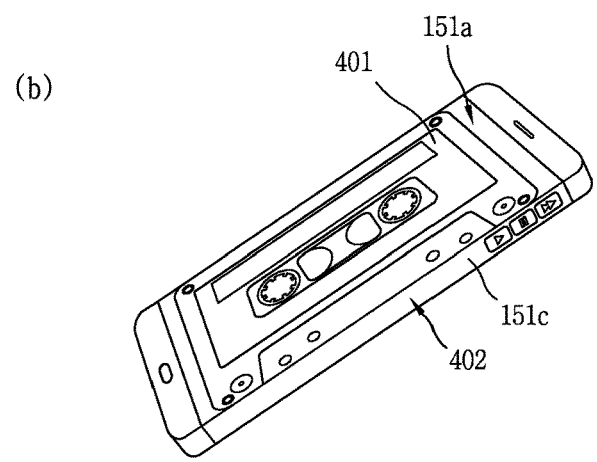
(c) 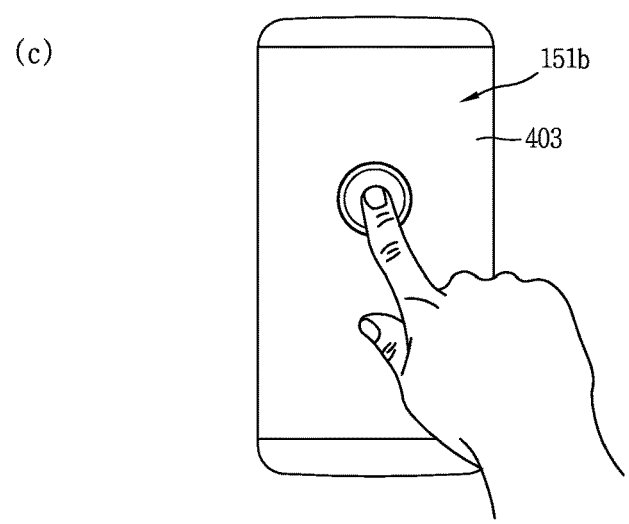

FIG. 5A
(a)
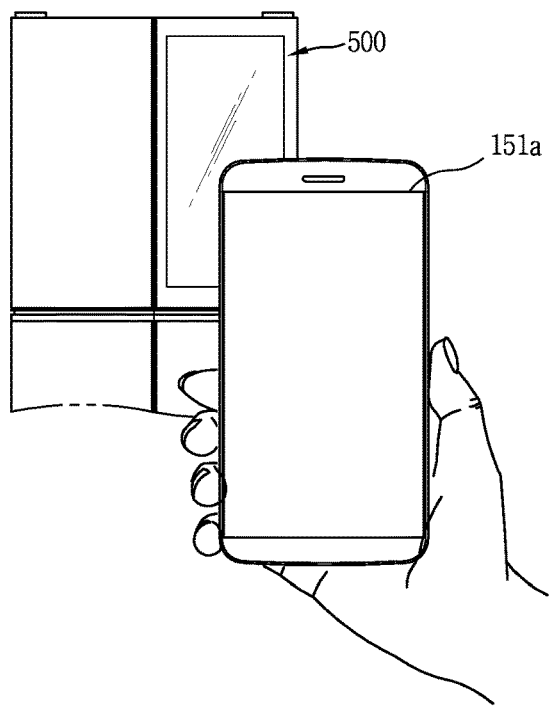
(b)
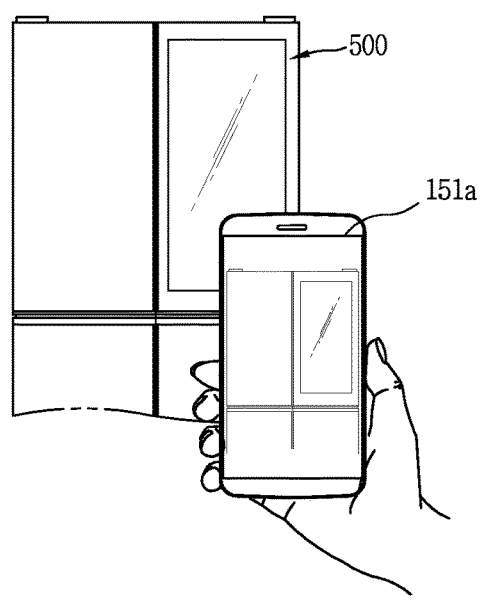

FIG. 5B
(a)
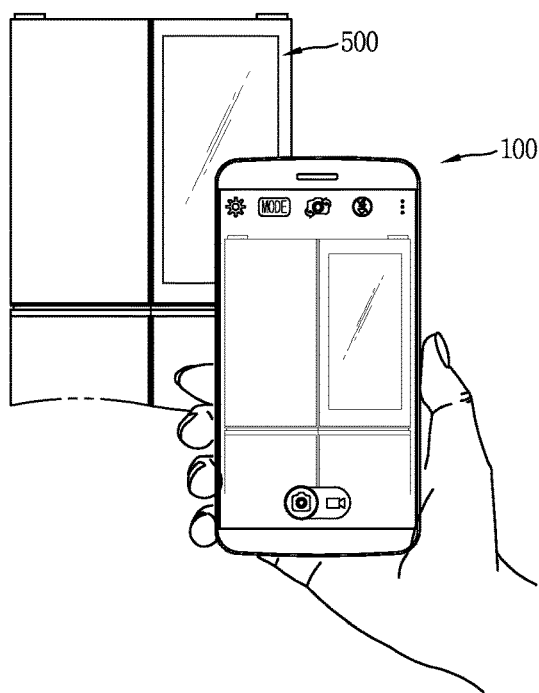
(b)
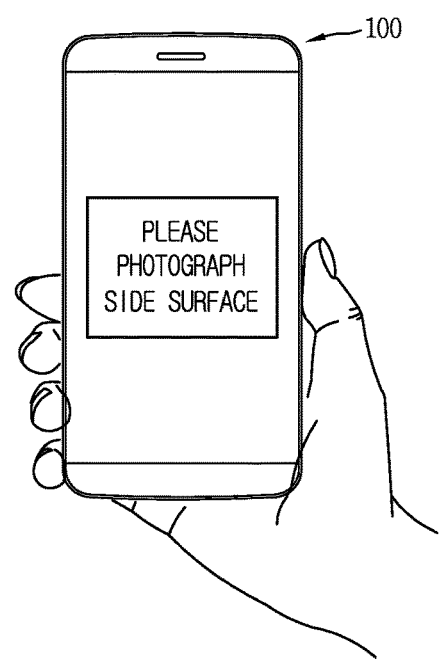

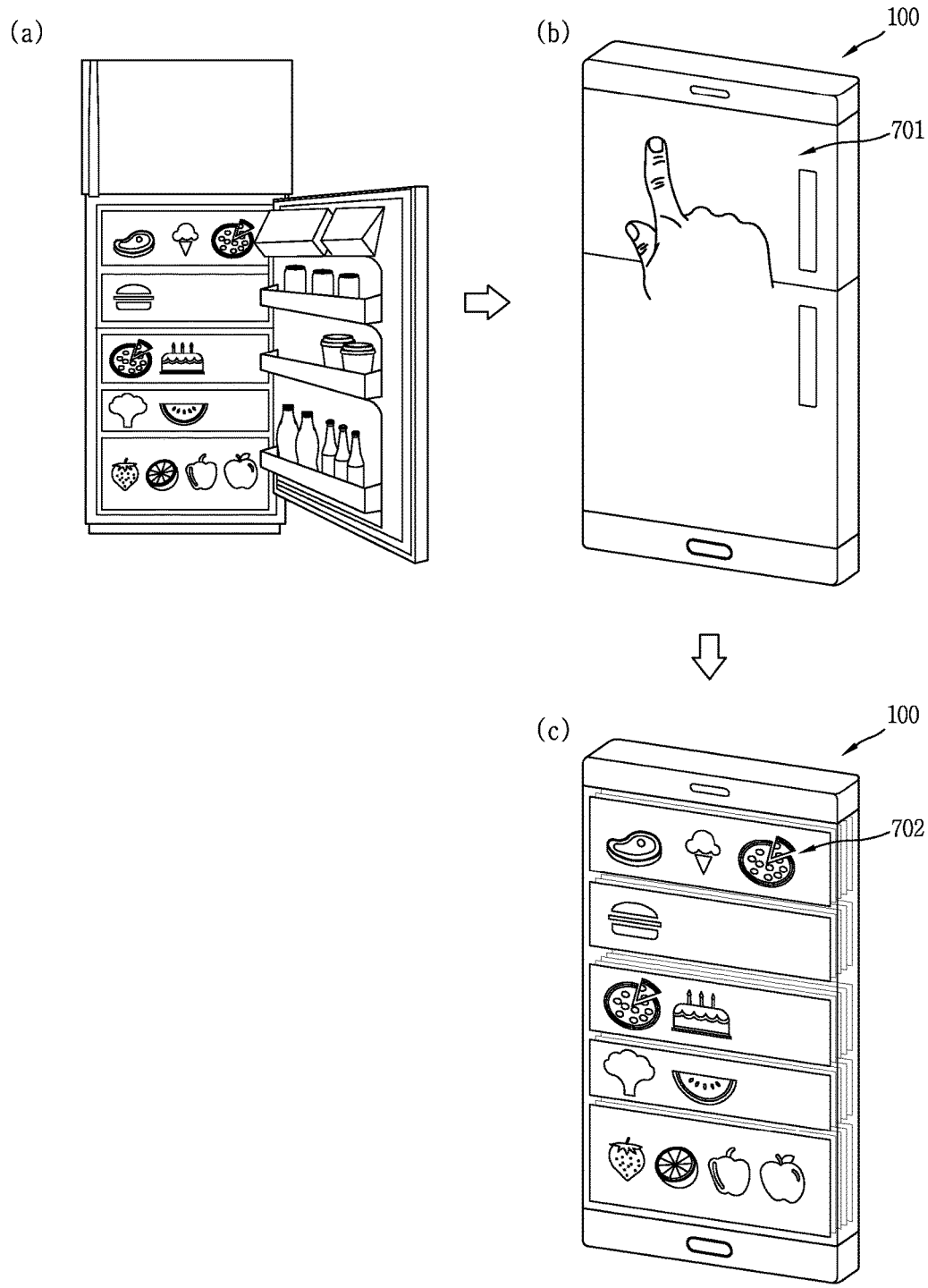

FIG. 8A
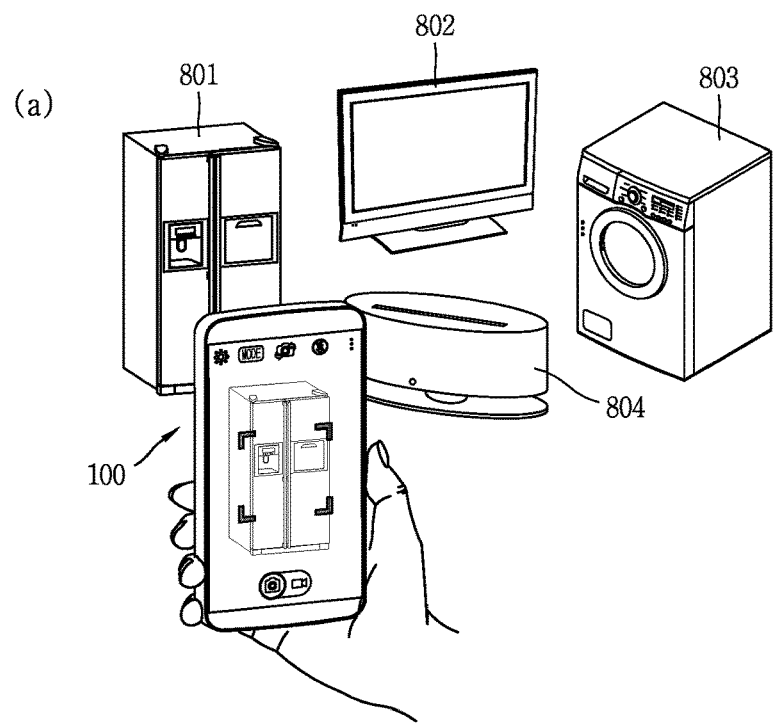
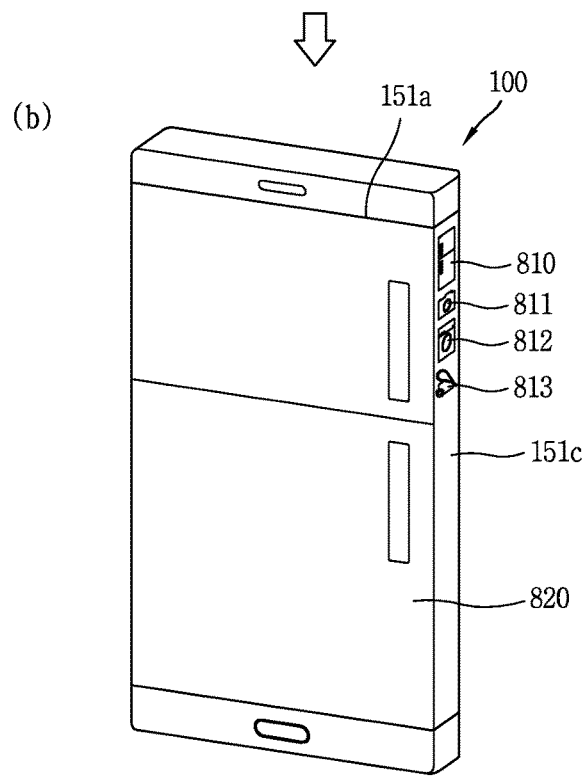

MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2016-0085729, filed on Jul. 6, 2016, the contents of which are hereby incorporated by reference herein in its entirety.

BACKGROUND OF THE INVENTION

1. Field of the Invention

The present disclosure relates to a mobile terminal having a plurality of display areas and a control method thereof.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Efforts are ongoing to support and increase the functionality of mobile terminals. Such efforts include software and hardware improvements, as well as changes and improvements in the structural components.

Conventionally, a touch screen is provided on a front surface of a terminal to provide information to a user, receive a user input, and recently, in order to enhance user convenience, an information input/output area tends to extend to at least one of a side surface and a rear surface.

In addition, recently, flexible displays have been actively developed, and a terminal having a novel form using such flexible displays is required to be developed.

SUMMARY OF THE INVENTION

Therefore, an aspect of the detailed description is to provide a mobile terminal capable of effectively displaying information regarding an external device by using a touch screen extending from a front surface to a side surface and a rear surface by interworking with a peripheral device available for communication, and a control method thereof.

Another aspect of the detailed description is to provide a mobile terminal capable of providing various functions by cooperatively operating user inputs applied to different sides, by utilizing a touch screen extending from a front surface to a side surface and a rear surface, and a control method thereof.

Another aspect of the detailed description is to provide a mobile terminal capable of inputting a new type of user input different from a related art.

To achieve these and other advantages and in accordance with the purpose of this specification, as embodied and broadly described herein, a mobile terminal may include: a main body having a front surface, a side surface, and a rear surface; a display disposed on the front surface and extending from the front surface to the side surface; a wireless communication unit wirelessly communicating with an external device; and a controller receiving identification information of the external device in response to recognition of the external device, and controlling information output on the touch screen on the basis of the received identification information, wherein, on the basis of the identification information of the external device, the controller controls the display to output information corresponding to a front appearance of the external device on a front display area corresponding to the front surface of the main body among display areas of the display and to output information corresponding to a side appearance of the external device on a side display area corresponding to the side surface of the main body among the display areas of the display, and controls a function related to the external device in a state in which information corresponding to an appearance of the external device is output on the display.

A function icon controlling a function related to the external device may be output on a display area of the display corresponding to a position of the external device in which a function key is disposed.

The identification information may include appearance image information of the external device, and the controller may control information output on the front display area and the side display area using an appearance image of the external device included in the identification information.

In response to identification information received from the external device, the controller may search for appearance image information of the external device corresponding to the received identification information from a previously specified database, and control information output on the front display area and the side display area using the searched appearance image information.

When an event occurs in the external device and the generated event information is received from the external device, the controller may output information corresponding to an appearance of the external device on the front and side display areas.

The wireless communication unit may communicate with a plurality of external devices, and information output on the front and side display areas may vary according to from which of the plurality of external devices, event information has been received.

The controller may control the display to output information corresponding to an appearance of an external device having a strongest wireless signal strength with respect to the wireless communication unit, among the plurality of external devices, on the basis of wireless signal strength between the plurality of external devices and the wireless communication unit.

The display may further include: a rear display area corresponding to the rear surface of the main body, and the controller may control the display to output information corresponding to a rear appearance of the external device on the rear display area.

To achieve these and other advantages and in accordance with the purpose of this specification, as embodied and broadly described herein, a mobile terminal may include: a main body having a front surface, a side surface, and a rear surface; a display disposed on the front surface and extending from the front surface to the side surface; a camera disposed in the main body; a wireless communication unit paired with an external device and wirelessly communicating with the external device; and a controller activating the camera in response to pairing with the external device, and outputting image capture guide information to capture an image of an appearance of the external device through the activated camera, wherein the controller captures appearance images corresponding to a front appearance and a side appearance of the external device through the camera on the basis of a user request applied according to the image capture guide information, and when the capturing is completed, the controller outputs a front appearance image of the external device on a front display area corresponding to the front surface of the main body among display areas of the display, and outputs a side image of the external device on a side display area corresponding to the side surface of the main body, among the display areas of the display.

The appearance image of the external device obtained through the camera may be associated with the identification information of the external device and stored in a memory, and after pairing with the external device is terminated, when pairing between the external device and the wireless communication unit is performed again, the controller may control information output on the front and side display areas of the display using the appearance image of the external device stored in association with the identification information of the external device.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 3 is a flow chart illustrating a method for outputting information regarding an external device on a touch screen according to an embodiment of the present disclosure.

FIGS. 4A, 4B, and 4C are conceptual views illustrating an example of applying the method of FIG. 3.

FIGS. 5A and 5B are conceptual views illustrating a method for obtaining appearance information of an external device.

FIGS. 7A, 7B, and 7C are conceptual views illustrating a method for controlling an external device from a mobile terminal.

FIGS. 8A and 8B are conceptual views illustrating a method for controlling a plurality of external devices.

DETAILED DESCRIPTION OF THE INVENTION

Figure 1A:
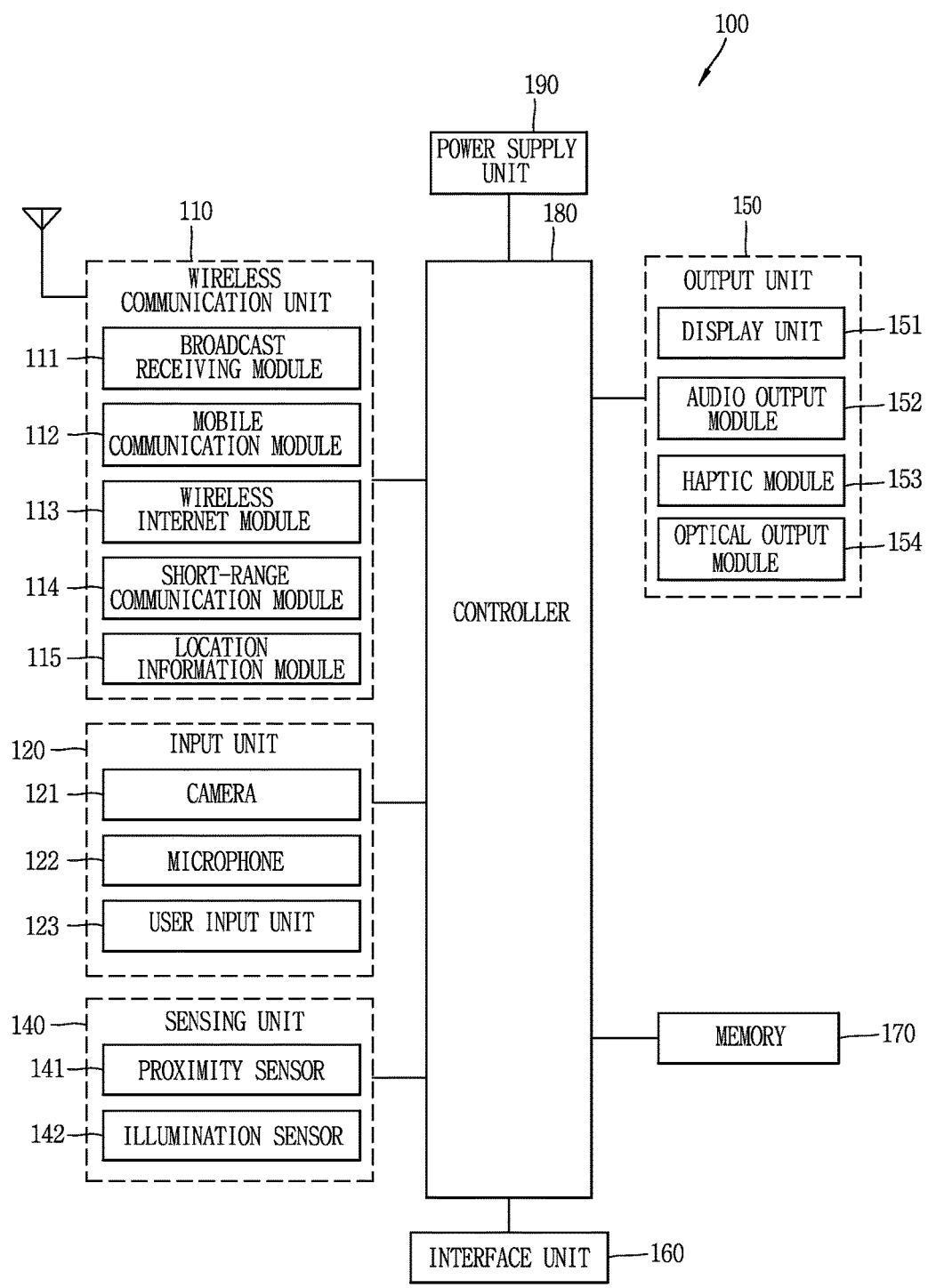
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
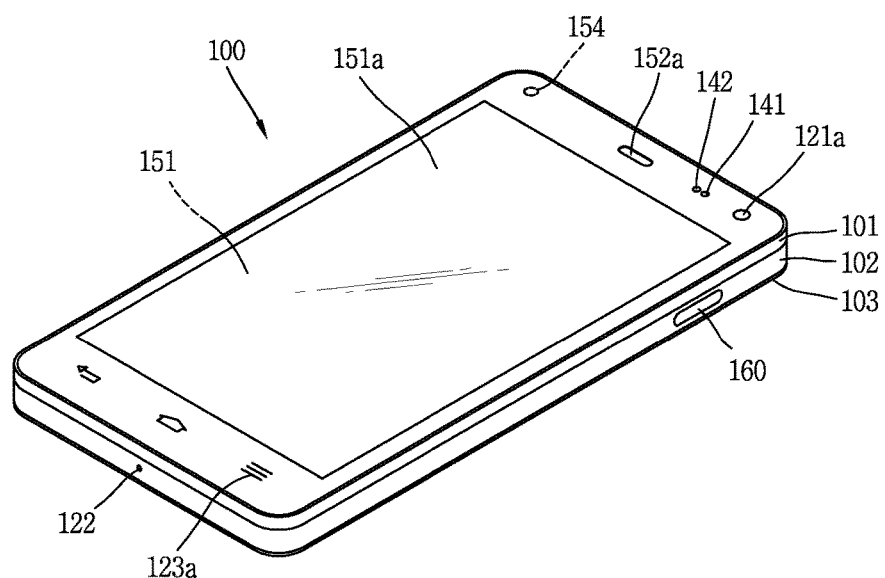
FIGS. 1B and 1C are conceptual views of one example of the mobile terminal, viewed from different directions.
Figure 1C:
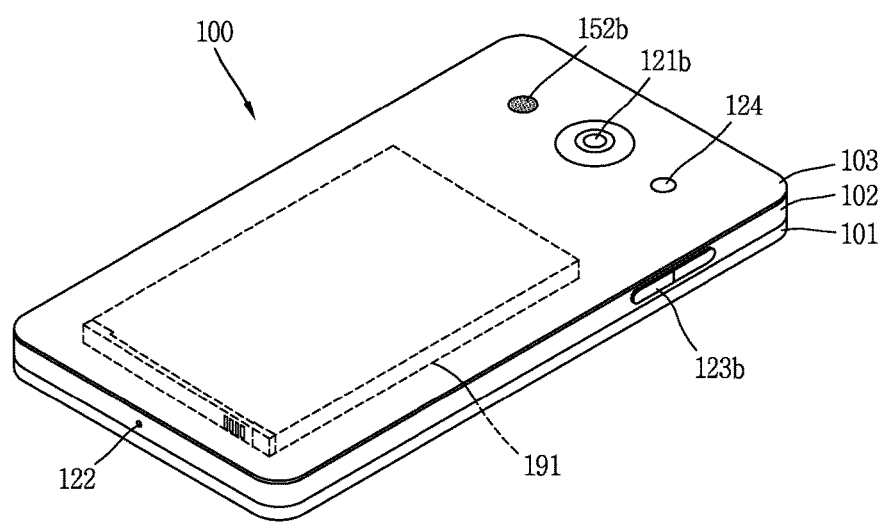

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, so far, the mobile terminal having a single display area has been described. The mobile terminal according to an embodiment of the present disclosure may have a plurality of display areas, as well as a single display area. That is, the mobile terminal according to an embodiment of the present disclosure may provide controlling convenience regarding the mobile terminal.

Figure 2A:
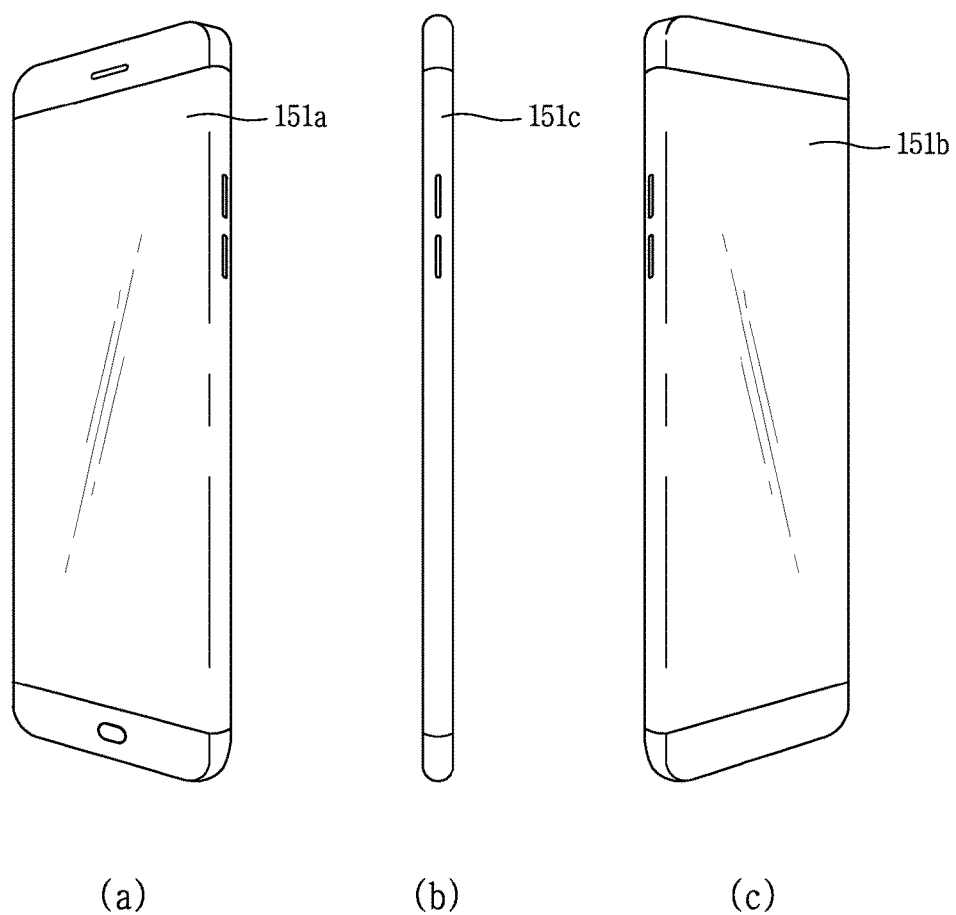
FIGS. 2A and 2B are conceptual views illustrating a mobile terminal according to an embodiment of the present disclosure.
Figure 2B:
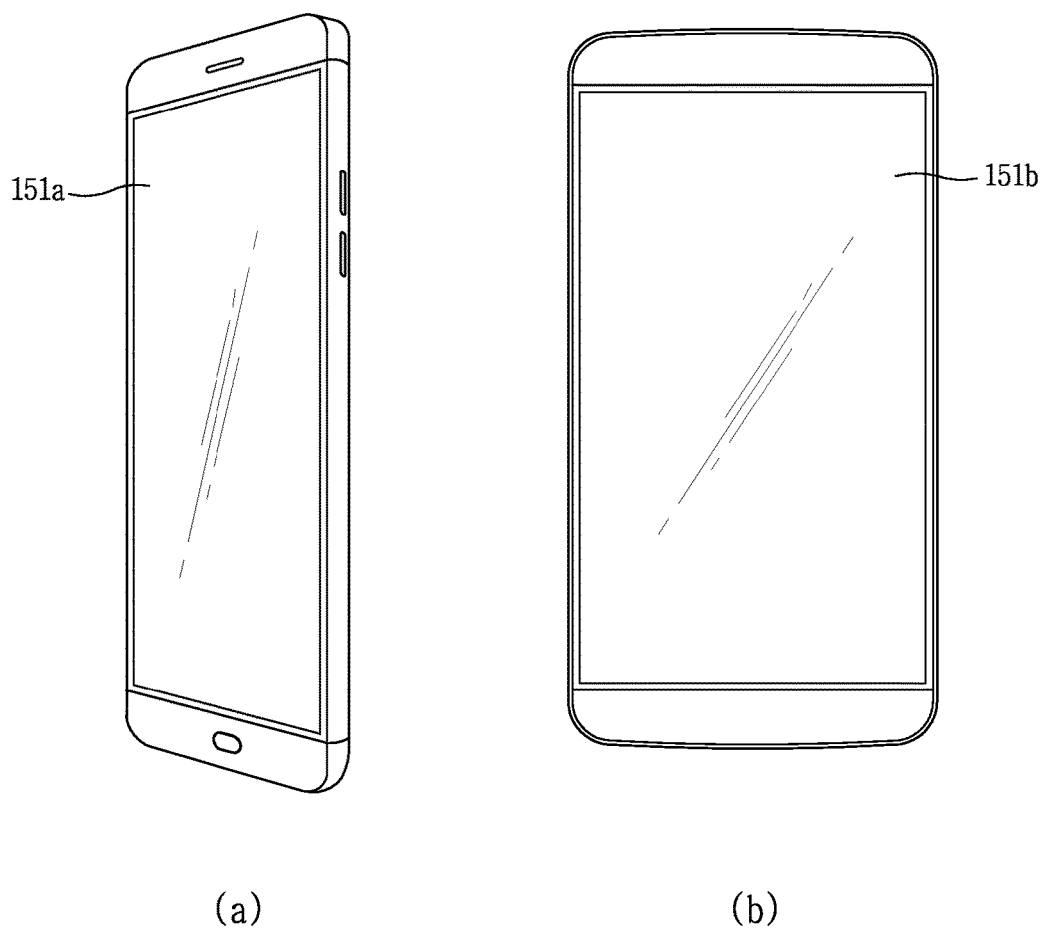

Hereinafter, examples of a mobile terminal having a plurality of display areas will be described in detail with reference to the accompanying drawings. FIGS. 2A and 2B are conceptual views illustrating a mobile terminal according to an embodiment of the present disclosure.

First, as illustrated in FIG. 2A, a touch screen 151 (or a display) according to an embodiment of the present disclosure may have an additional touch screen in at least one of a side surface and a rear surface of the terminal body, in addition to the touch screen 151*a* disposed on a front surface of the terminal body.

Thus, the touch screen 151 may include a plurality of touch screen areas 151*a*, 151*b*, and 151*c*.

The terminal body 100 may have the front surface, the rear surface, and the side surface, and the first touch screen area 151*a* (or a first area or a front touch screen area) may be disposed on a front side of the terminal body and a second touch screen area 151*b* may be disposed on a rear side of the terminal body.

Also, a third touch screen area 151*c* (or a third area or a side touch screen area) may be disposed on a side surface of the terminal body Meanwhile, the touch screen according to an embodiment of the present disclosure may be implemented as a flexible display. In this case, the first, second, third touch screen regions 151*a*, 151*b*, and 151*c* may be include in a single touch screen 151 as illustrated in FIG. 2A.

That is, the single touch screen 151 may include a plurality of touch screen regions 151*a*, 151*b*, and 151*c*.

Thus, the first, second, and third touch screen regions may be formed without being physically discriminated or without corners.

The second touch screen area 151*b* may extend from the first and third touch screen regions 151*a* and 151*c*. Boundaries between the first, second, and third touch screen regions 151*a*, 151*b*, and 151*c* may form a curved surface.

Here, the boundaries between the first, second, and third touch screen regions 151*a*, 151*b*, and 151*c* may be discriminated by software processing.

The controller 180 may output a specific image to the boundary areas of the plurality of touch screen regions 151*a*, 151*b*, and 151*c* to allow the user to recognize the boundaries between the plurality of display areas.

Meanwhile, the plurality of touch screen regions 151*a*, 151*b*, and 151*c* may be independently controlled by software processing.

In another example, although not shown, the plurality of touch screen regions 151*a*, 151*b*, and 151*c* may have a physically independent structure.

Here, the mobile terminal 100 may have a plurality of physically separated touch screens (e.g., two or three or more display units).

In a case in which the mobile terminal has a plurality of physically divided touch screens, the controller controls each of the plurality of touch screens.

Here, each of the touch screens may have a sub-controller allocated thereto to control the touch screen.

For example, in the mobile terminal, the first touch screen area 151*a* may be controlled by a first sub-controller, and the second touch screen area 151*b* may be controlled by a second sub-controller.

Also, the first and second sub-controllers may be controlled by a main controller.

Also, the first and second sub-controllers may be controlled by the main controller.

In another example, the first and second physically divided first and second display units may be controlled by a single controller.

As discussed above, the mobile terminal according to the present disclosure may have a plurality of touch screen regions (or a plurality of display units, which will be referred to as "a plurality of touch screen areas", hereinafter) through physical differentiation or software differentiation.

In addition, in a state in which the touch screen area is activated (ON state), the controller 180 of the mobile terminal according to the present disclosure may control any one area to an (or ON state) or control another area to be deactivated (OFF state).

That is, in a case in which a user is viewing any one area among the plurality of areas, it may be difficult for the user to view any other region, and thus, the controller 180 may maintain only any one area among the plurality of areas in an activated state.

Also, the controller may determine which of the plurality of areas the user is viewing, through sensed information using one of various sensors (illumination sensor, a proximity sensor, a camera sensor, a G sensor, and the like), or any combinations thereof, provided in the mobile terminal.

Also, the controller 180 may control at least one area not viewed by the user, among the plurality of areas, to be deactivated.

In detail, in the mobile terminal according to the present disclosure, a plurality of touch screen areas (hereinafter, referred to as "a plurality of areas" may have the same driving state or different driving states.

Here, the plurality of areas may be driven to any one of an activated state and a deactivated state.

The activated state may refer to a state in which visual information is displayed and touch sensing is available. That is, the activated state refers to a state in which a corresponding touch screen region is turned on.

Also, the deactivated state may refer to a state in which displaying of visual information is limited. In this case, a lighting unit illuminating a corresponding touch screen region is in an OFF state.

In the present disclosure, the touch screen region in a deactivated state may be configured to be available for touch sensing. That is, in the present disclosure, the deactivated state may refer to a state in which displaying visual information is limited and touch sensing is available.

That is, the controller 180 may control a corresponding region such that touch sensing is available in the region in the deactivated state.

Meanwhile, in the present disclosure, a deactivated state in which displaying of visual information is limited and touch sensing is available may be termed a doze mode. In this case, a corresponding region may be expressed as being in the doze mode.

Here, the region in the doze mode may be activated at every preset specific period.

Meanwhile, the touch sensor may sense a tap applied to the display unit 151 in different manners in the deactivated state (or doze mode) and the activated state.

Also, settings related to an operation of the touch sensor may be set to be different in the deactivated state (or a doze mode) and the activated state.

For example, a threshold value set to recognize a touch may be set to be different. That is, sensitivity of the touch sensor regarding a touch may be increased in the activated state than in the deactivated state (or the doze mode).

This is because the deactivated state (or the doze mode) may be a mode for sensing a touch, while reducing power consumption, and the activated state is a mode for accurately sensing a user input.

Meanwhile, when a first touch is sensed in the deactivated state, the controller 180 may drive the touch sensor of a region in a deactivated state such that a sensing period thereof is equal to a touch sensing period of a display area in an activated state.

This is to increase accuracy of a touch applied to the touch screen area even in the deactivated state.

In this case, a touch sensing unit of the area in the deactivate state may be driven at a different touch sensing period even in the deactivated state.

For example, before a first touch is applied, a touch is sensed at a first frequency, and when a first touch is applied, a touch may be sensed at a second frequency faster than the first frequency.

Also, if a follow-up touch is not applied during a preset period of time while the touch sensor is being driven at the second frequency, the controller 180 may drive the touch sensor at the second frequency again.

In this manner, in the present disclosure, accuracy of a touch may be enhanced, while minimizing power consumption of the mobile terminal, by variously modifying a driving scheme of the touch sensor.

Meanwhile, each of the plurality of areas of the mobile terminal according to the present disclosure may be driven to any one of the activated state and the deactivated state.

Also, in the mobile terminal according to the present disclosure, any one of the plurality of areas may be constantly in an activated state.

That is, in this case, the display area constantly in the activated state may be expressed as "always on".

In this case, the always-on target area may also be driven to a deactivated state according to a remaining battery capacity of the mobile terminal.

Meanwhile, the mobile terminal as described above may communicate with at least one external device through the wireless communication unit 110. In the present disclosure, the mobile terminal and the external device may communicate with each other through at least one central server or may communicate with each other directly.

Meanwhile, in the mobile terminal according to the present disclosure, appearance information of a paired external device may be output on at least one of the plurality of touch screen areas through at least one of various communication methods, and in a state in which appearance information is output, a function related to the external device may be performed or a control command regarding the external device may be transmitted.

Figure 4A:
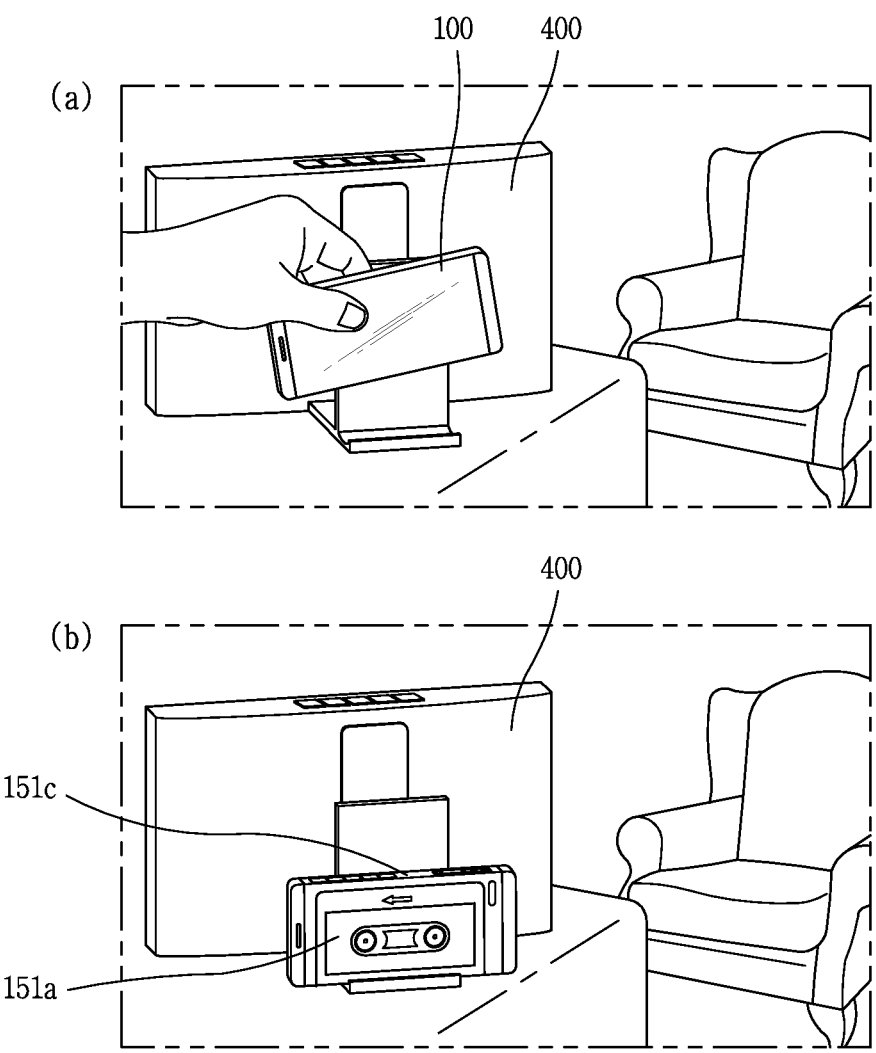
Figure 4C:
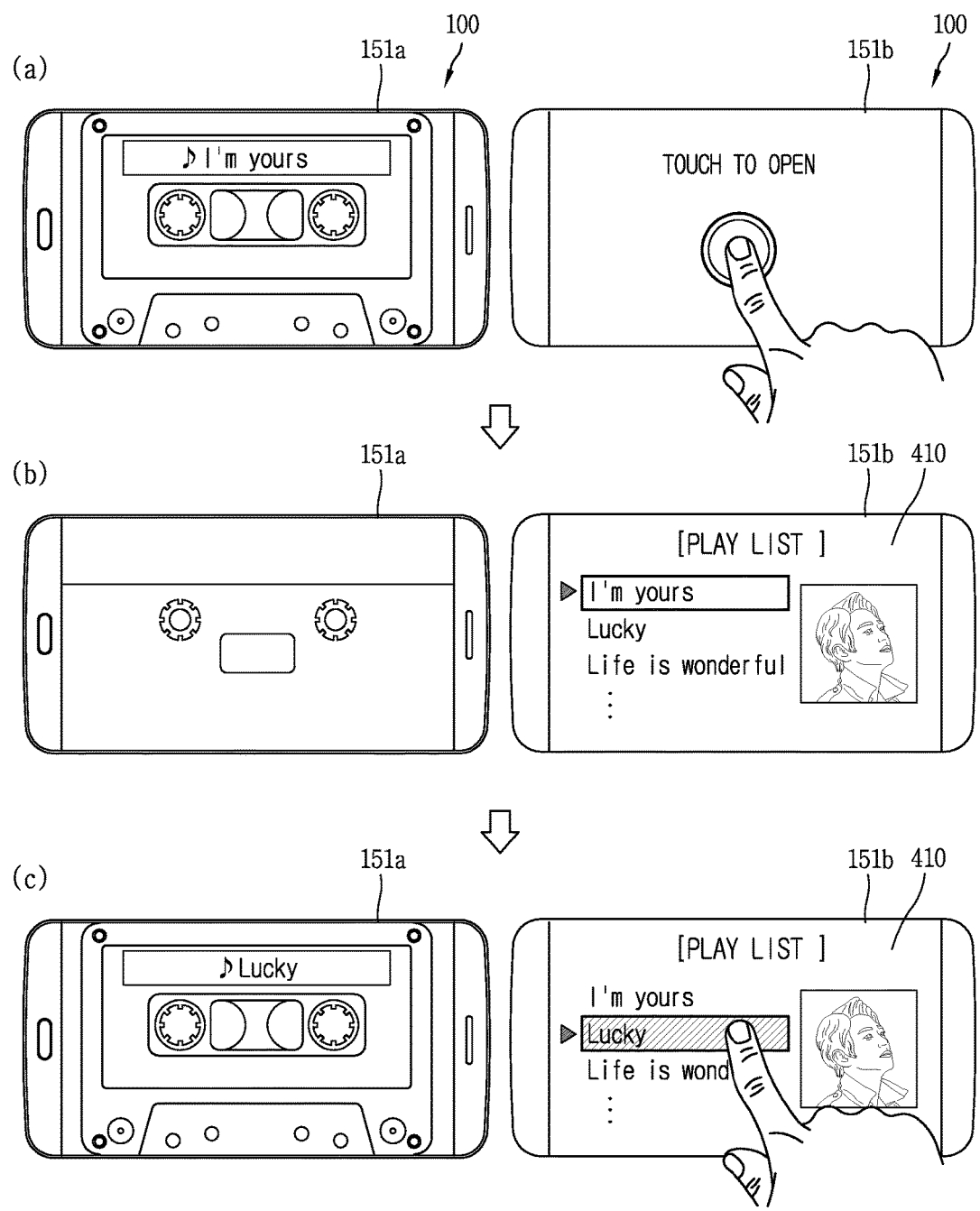

Hereinafter, a method for outputting appearance information regarding a paired external device and a method for performing various controlling related to various external devices using the same will be described in detail with reference to the accompanying drawings. FIG. 3 is a flow chart illustrating a method for outputting information regarding an external device on a touch screen according to an embodiment of the present disclosure, FIGS. 4a, 4b, and 4C are conceptual views illustrating an example of applying the method of FIG. 3, and FIGS. 5A and 5B are conceptual views illustrating a method for obtaining appearance information of an external device.

Meanwhile, in the following embodiments, the mobile terminal having the structure discussed with reference to FIG. 2A will be described as an example, but the embodiments according to the present disclosure may also be applied to the mobile terminal having the structure described above with reference to FIG. 2B or a mobile terminal having a touch screen area only on a front surface and a rear surface in the same manner.

In the mobile terminal according to the present disclosure, an external device is recognized and the mobile terminal is paired with the recognized external device (S310).

Here, "pairing" refers to a state in which information is transmitted between the mobile terminal and the external device, that is, a state in which the mobile terminal and the external device are connected to transmit valid data to each other. For the purpose of pairing, an authentication process may need to be performed between the mobile terminal and the external device, and if the mobile terminal refuses pairing, pairing may not be made between the external device and the mobile terminal. Also, in a case in which the mobile terminal and the external device have paired in the past, the authentication process may not be performed or a request for authentication information for authentication may be omitted.

Here, the external device may be a device that belongs to the same home network or may be a paired device paired regardless of home network. For example, the external device may be any device among various electronic devices or home appliances without being limited to a type thereof, as long as it is able to perform a function in an interworking manner by communicating with the mobile terminal.

Meanwhile, recognizing an external device and communication with the external device may be performed according to various communication schemes. The controller 180 may recognize an external device and perform pairing with the external device using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, and Wireless USB (Wireless Universal Serial Bus). Meanwhile, a communication scheme for recognizing the external device and a communication scheme for performing data communication after pairing is performed may be different.

For example, the controller 180 may recognize an external device positioned in a near field through NFC, and perform data communication with the external device through BLUETOOTH™.

Meanwhile, as discussed above in step S310, when recognizing the external device and pairing with the external device are performed, identification information is received from the external device (S320). Here, steps S310 and S320 may be performed in a single process. That is, when the external device is recognized, the controller 180 may receive identification information from the eternal device.

Here, the identification information of the external device may include various types of information such as a type of the external device, data related to the external device, history information of the external device, and the like.

Thereafter, the controller 180 outputs information corresponding to an appearance of the paired external device to at least one of a front surface, a side surface, and a rear surface of the touch screen on the basis of the received identification information (S330).

The controller 180 may output the information corresponding to the appearance of the external device on the front touch screen area 151a corresponding to the front side of the main body of the mobile terminal, among the touch screen areas of the touch screen 151.

Also, the controller 180 may control the touch screen to output information corresponding to an appearance of a side of the external device, on the side touch screen area 151c corresponding to the side surface of the main body among the touch screen areas of the touch screen 151.

Also, the controller 180 may control the touch screen 151 to output information corresponding to a rear appearance of the external device on the rear touch screen area 151b among the touch screen areas of the touch screen 151.

For example, when an external device 400 is recognized through the wireless communication unit 110 and the mobile terminal is connected to the external device 400 for data communication as illustrated in (a) of FIG. 4A, the controller 180 may output information regarding an appearance of the external device 400 on at least one of the plurality of touch screen areas 151a, 151b, and 151c of the touch screen 151 as illustrated in (b) of FIG. 4A.

Here, the information corresponding to the appearance of the external device 400 may be information regarding the same appearance as that of the currently connected external device or may be information regarding an appearance corresponding to the same type as that of the external device 400.

As illustrated, when the connected external device is an audio device (e.g., an audio system having a Bluetooth function), the controller 180 may output an appearance image corresponding to the audio device on the touch screen 151.

As illustrated in (a) of FIG. 4B, a front image 401 corresponding to a front side of the audio device may be output on the front touch screen area 151a, and as illustrated in (b) of FIG. 4B, a side image 402 corresponding to the side of the audio device may be output on the side touch screen area 151c. A control key (or a function key) for controlling the audio device may be output on the side of the audio device. In addition, as illustrated in (c) of FIG. 4B, a rear image of the audio device or a control screen 403 may be output on the rear touch screen area 151b.

As illustrated in FIG. 4C, current state information of the external device (or the audio device) may be output, together with an appearance image of the external device, on the front touch screen area 151a. For example, information of currently played music may be output.

The external device may be controlled on the basis of a touch applied to the rear touch screen area 151b. For example, as illustrated, in a case in which a preset type of touch or a touch for selecting a specific menu is applied to the rear touch screen area 151b, a music play list 410 may be output. Such a play list may also be output on the rear touch screen area 151b without any particular touch process.

Meanwhile, when specific music is selected from the play list output on the rear touch screen area 151b, the controller 180 may transmit a control signal to the external device such that the selected is played in the paired external device.

As illustrated, in the mobile terminal according to the present disclosure, by outputting the appearance image which is the same as or similar to the appearance of the connected external device on the touch screen 151, the user may have a user experience as if the user directly touches the external device or directly operates the external device.

The controller 180 may output information corresponding to the appearance of the external device on at least one of the front, side, and rear surfaces or may output the information corresponding to the appearance of the external device on only any one thereof.

Meanwhile, the information regarding the appearance of the external device may be obtained in various manners. For example, appearance image information of the external device may be included in identification information received from the external device. In this case, the controller 180 may control the touch screen using the appearance image information of the external device included in the identification information. Such identification information may include position information of a manipulation unit (a software key or a hardware key) provided in the external device and a control command (or function) corresponding to the manipulation unit.

On the basis of position information indicating where the manipulation unit is positioned in the external device, the controller 180 may output a function key corresponding to the manipulation unit to a position of the touch screen 151 corresponding to a position of the manipulation unit of the external device. That is, the function icon controlling a function related to the external device may be output on a touch screen region corresponding to a position where the function key (or the manipulation unit) is disposed in the external device.

Meanwhile, the appearance image (or appearance information) of the external device may be present in the mobile terminal 100 or in an external repository, rather than being included in the identification information. In this case, the controller 180 may search for appearance image information of the external device corresponding to the received identification information from a specific database, and output the searched appearance image on the touch screen 151.

Meanwhile, in the mobile terminal according to the present disclosure, an appearance image of an external device 500 (e.g., a refrigerator) may be obtained through the camera 121 provided in the mobile terminal. As illustrated in (a) of FIG. 5A, when the external device 500 is recognized, the controller 180 may search the memory 170 for information regarding an appearance image of the external device 500. When information regarding the appearance image has been stored according to a search result, the controller 180 may output an appearance image corresponding to the external device on the touch screen 151 as illustrated in (b) of FIG. 5A.

Also, when image regarding the appearance image has not been stored according to the search result, the controller 180 may perform a process of imaging the external device. When information regarding an appearance image regarding the external device is not present according to the search result, the controller 180 may activate the camera and output guide information guiding imaging of the external device.

The controller 180 may activate the camera even without a user selection, or allow the user to select whether to activate the camera.

The controller 180 may output image capture guide information such that at least one of front surface, a side surface and a rear surface of the external device is imaged through the activated camera. For example, when imaging the front appearance is completed, the controller 180 may output guide information guiding capturing a side appearance as illustrated in (b) of FIG. 5B.

In this manner, the controller 180 may capture appearance images corresponding to the front appearance, the side appearance, and the rear appearance of the external device through the camera on the basis of a user request applied according to the image capture guide information.

Also, when imaging is completed, the controller 180 may output the front appearance image of the external device on the front touch screen area 151*a* corresponding to the front side of the terminal body among touch screen areas of the touch screen, and output the side image of the external device to the side touch screen area 151*c* corresponding to the side surface of the terminal body among the touch screen areas of the touch screen. Also, according to circumstances, the controller 180 may output the rear appearance image of the external device on the rear touch screen area 151*c* corresponding to the rear surface of the terminal body, among the touch screen areas of the touch screen.

Meanwhile, the controller 180 may edit only a region corresponding to the external device among captured images, and output the same on the touch screen.

Also, the appearance image of the external device obtained through the camera may be stored in the memory in association with identification information of the external device. Also, after pairing with the external device is terminated, when pairing between the external device and the wireless communication is performed again, the controller 180 may output the appearance image of the external device on the touch screen using the appearance image of the external device stored in association with the identification information of the external device.

Meanwhile, in a state in which information regarding the appearance of the external device, that is, an appearance image of the external device, is output on the touch screen, when a touch input is applied to a function key (or a function icon) included in the appearance image or when a preset type of touch input is applied, the controller 180 may transmit a control command for controlling the external device to the external device or may perform a function related to the external device on the mobile terminal (S340).

In the mobile terminal and the control method thereof according to the present disclosure as describe above, the appearance information of the external device, which is the same as or similar to the appearance of the paired external device, on the touch screen extending from the front surface to the side surface and the rear surface. Thus, the user may easily recognize that an external device is controlled through information output through the mobile terminal.

Also, according to the mobile terminal and the control method thereof according to the present disclosure, a control key may be output to a position of the touch screen, which corresponds to a portion where software or hardware key provided in the external device is positioned. Thus, the user may easily input a control command for controlling the external device on the basis of a user experience.

Hereinafter, various examples of cases where an appearance image of an external device is output on the touch screen will be described in detail with reference to the accompanying drawings. FIGS. 6A, 6B, 6C, and 6D are conceptual views illustrating a case in which appearance information of an external device is output. In the following descriptions, it is assumed that an external device and the mobile terminal are paired to perform data communication with each other.

In the mobile terminal according to the present disclosure, an appearance image of an external device is not always output on the mobile terminal but may be output on the touch screen only when an external device is required to be controlled.

For example, in a case in which an external device is recognized and paired, the controller 180 may output an appearance image of the external device on the touch screen to allow the user to recognize the pairing of the external device.

Figure 6A:
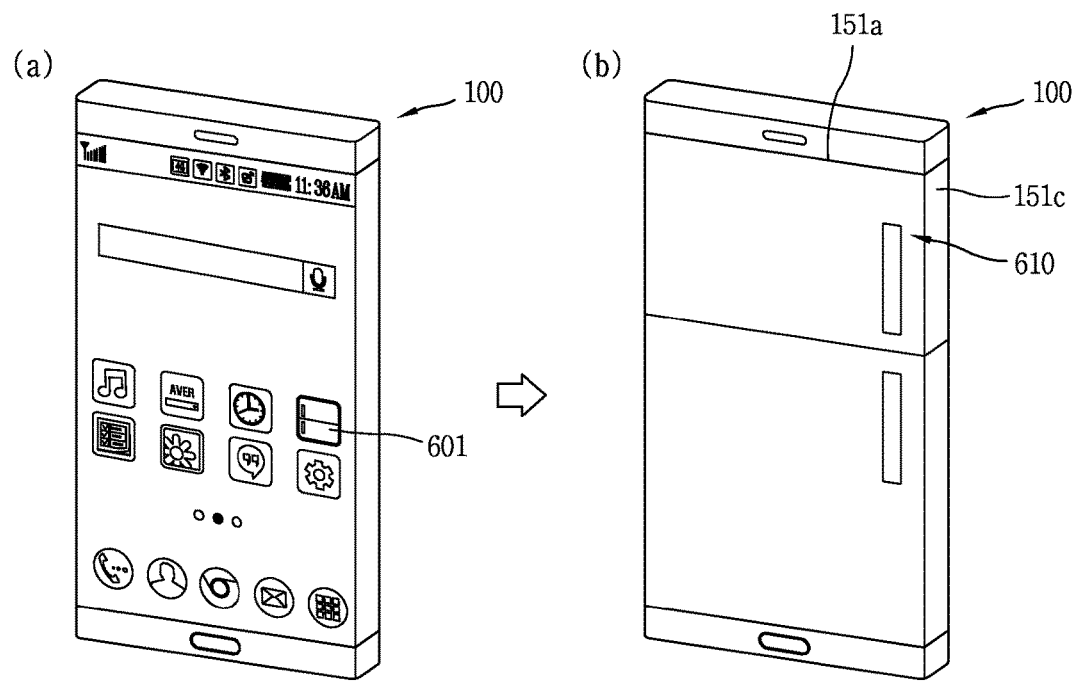
FIGS. 6A, 6B, 6C, and 6D are conceptual views illustrating a case in which appearance information of an external device is output.

In another example, when an icon 601 of an application performing a function interworking with an external device is selected as illustrated in (a) of FIG. 6A, the controller 180 may output an appearance image 610 of the external device on the touch screen as illustrated in (b) of FIG. 6A.

Figure 6B:
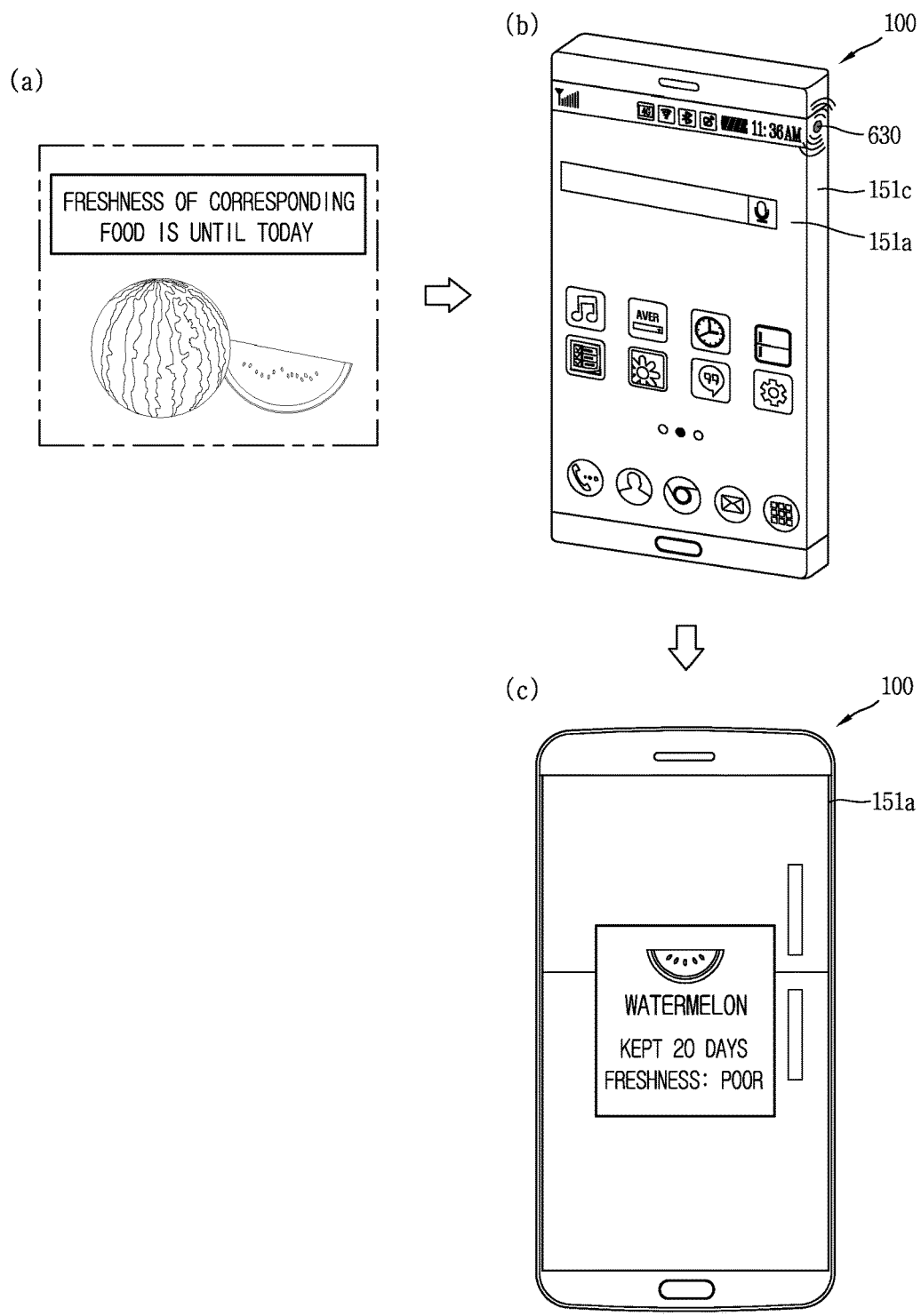

In another example, as illustrated in (a) of FIG. 6B, when an event occurs in an external device (for example, in a case in which the external device is a refrigerator and an expiration date has arrived), the external device may transmit event information to the mobile terminal. Also, the controller 180 may output an indicator 630 indicating the occurrence of the event in the external device on any one area of the touch screen (for example, a front touch screen area or the side touch screen area) on the basis of the event information transmitted from the external device as illustrated in (b) of FIG. 6B. Also, when a preset type of touch is applied to the indicator 630, the controller 180 may output an appearance image of the external device on at least one region of the touch screen as illustrated in (c) of FIG. 6B. In this case, the controller 180 may also immediately output information corresponding to the event information on the touch screen.

Also, in response to reception of the event information, instead of the indicator, the controller 180 may output an appearance image of the external device on the touch screen area of the mobile terminal for a preset period of time, to effectively inform the user about which external device the event has occurred. Also, when a user input is not applied for a preset period of time, the controller 180 may restore a state of the touch screen to a state before the appearance image is output.

Figure 6C:
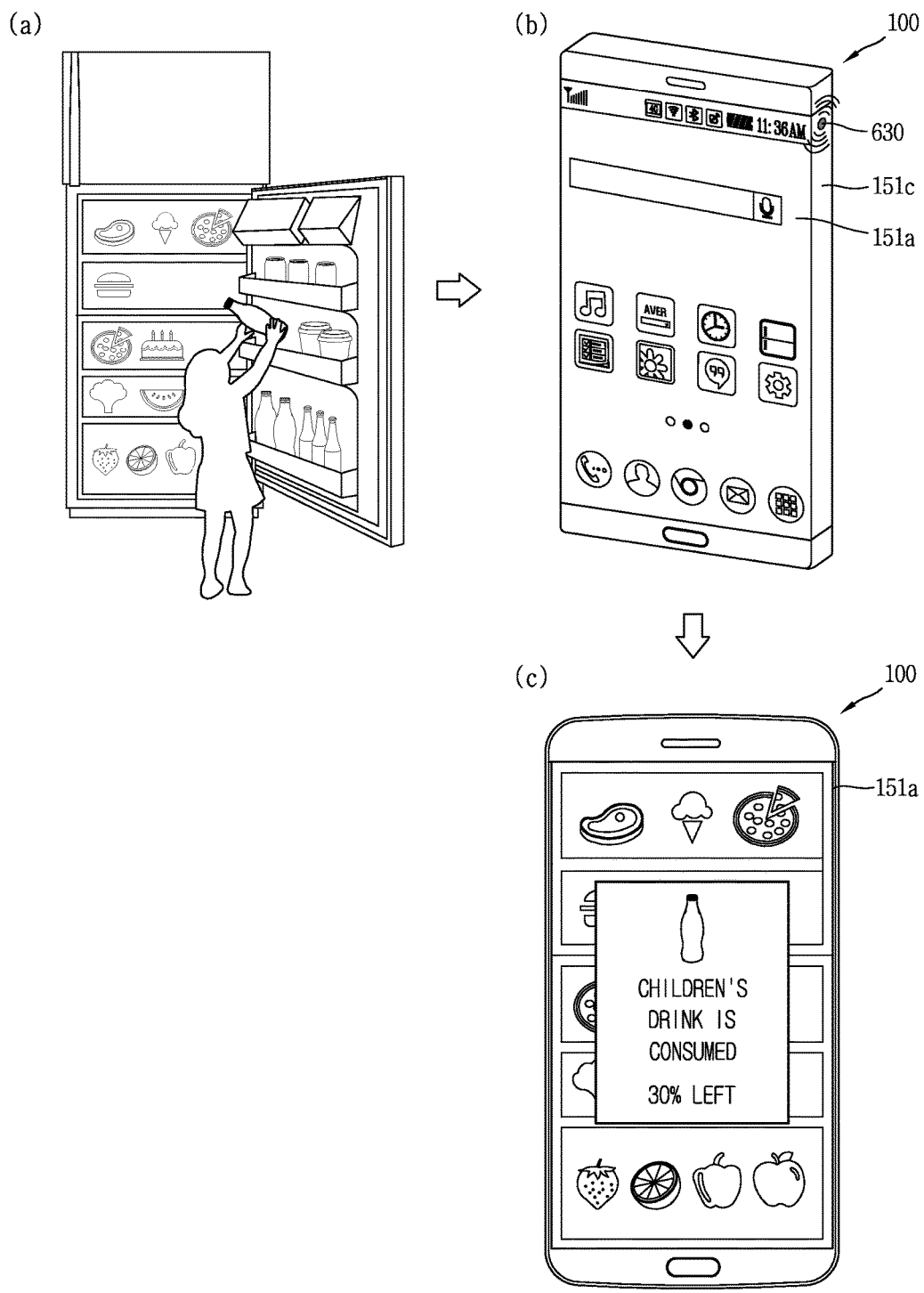

Meanwhile, the event that occurs in the external device may occur in the external device itself as illustrated in FIG. 6B or may occur as the user uses the external device as illustrated in FIG. 6C.

An example of an event that occurs in the external device itself may be a case in which a schedule stored in the external device has arrived.

Meanwhile, the external device may sense usage information of the external device (for example, an event that food is taken out from a refrigerator) and transmit the usage information to the mobile terminal. On the basis of the received usage information, the mobile terminal may output information corresponding to the usage information on the mobile terminal.

In addition, an event regarding the external device does not occur in the external device itself but may occur on the mobile terminal when a schedule set in relation to the external device arrives in the mobile terminal, rather than occurring in the external device itself, or when an external device which is highly likely to be used in relation to a current time and a current situation is paired according to a determination of the controller 180. The information regarding external devices highly likely to be used may be stored and present in the memory 170 on the basis of at least one of the current time and the current situation.

Figure 6D:
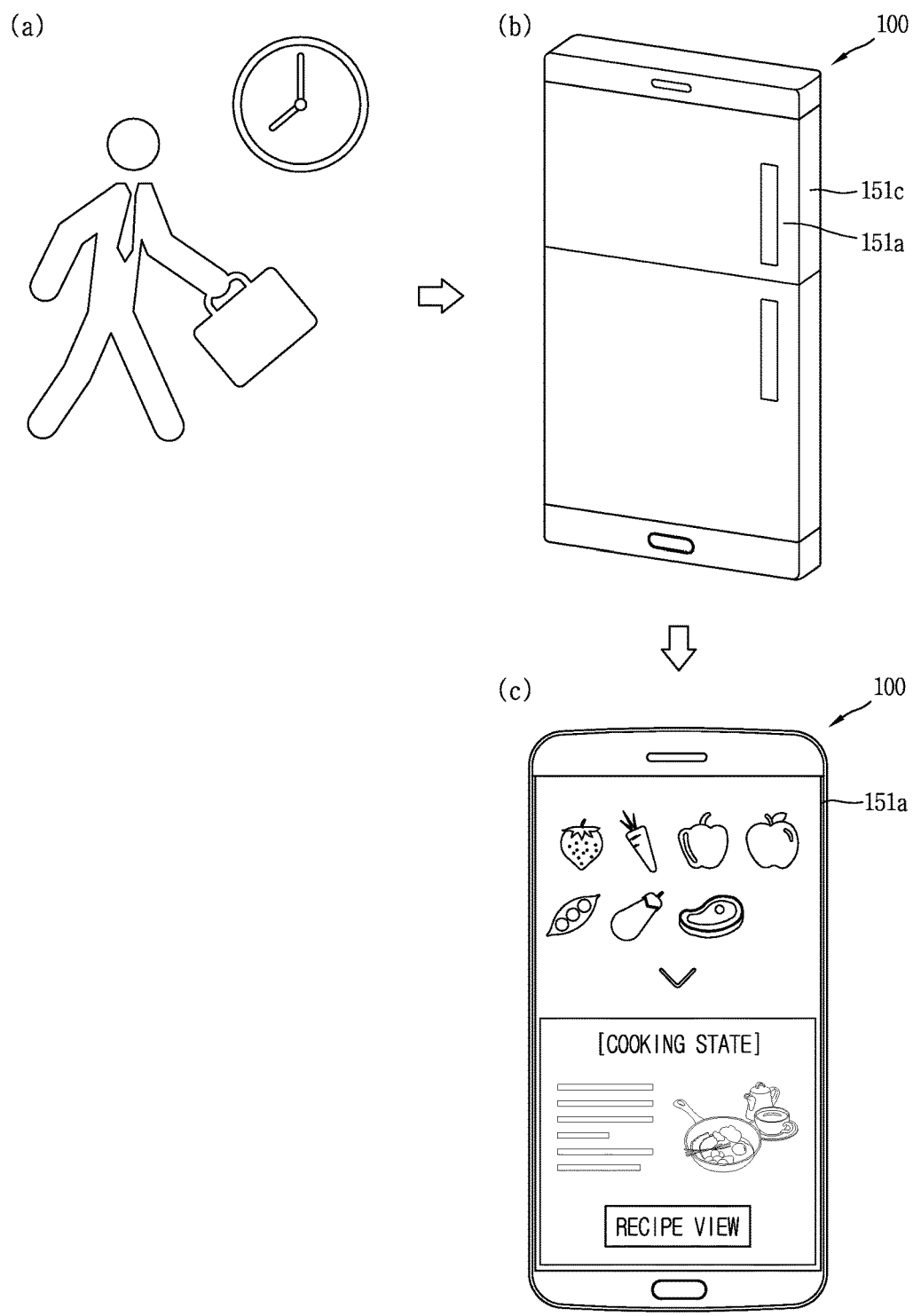

For example, as illustrated in FIG. 6D, when the current time is an evening time, the controller 180 may output an appearance image of a refrigerator on the touch screen 151 in consideration of high use frequency of the refrigerator, and output food information (recipe information) that may be cooked on the basis of materials stored in the refrigerator on the basis of a user selection as illustrated in (c) of FIG. 6D.

Meanwhile, although not shown, in a state in which an appearance image of the external device is output on the touch screen, when a new event (e.g., a call reception event) unrelated to the external device occurs, the controller 180 may output information regarding the newly generated event on one (e.g., the front touch screen area) of the plurality of touch screen areas and may continuously output the appearance image of the external device on another region (e.g., the side touch screen area or the rear touch screen area).

Thus, even when a function regarding the newly generated event is performed in the mobile terminal, the controller 180 may control the touch screen such that a control command regarding the external device is applied through another area.

As discussed above, in the mobile terminal according to the present disclosure, when information to be output on the mobile terminal in relation to an external device is present, an appearance image corresponding to the external device is output on the mobile terminal, whereby presence of the information is informed to the user, increasing user convenience.

Figure 7B:
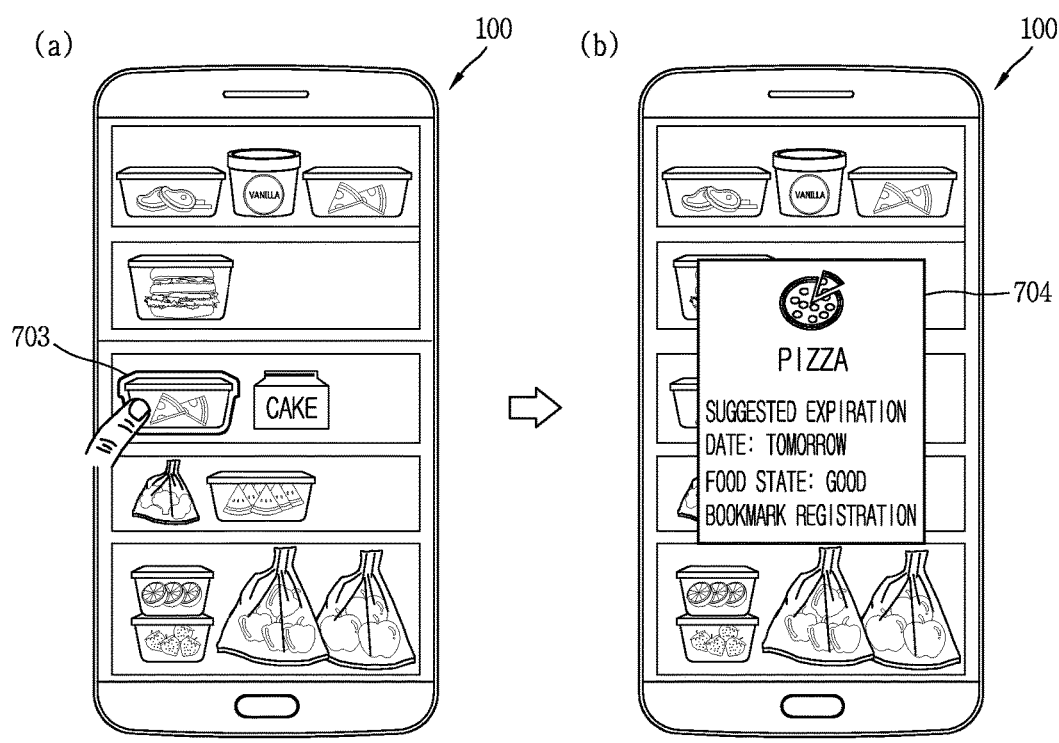
Figure 7C:
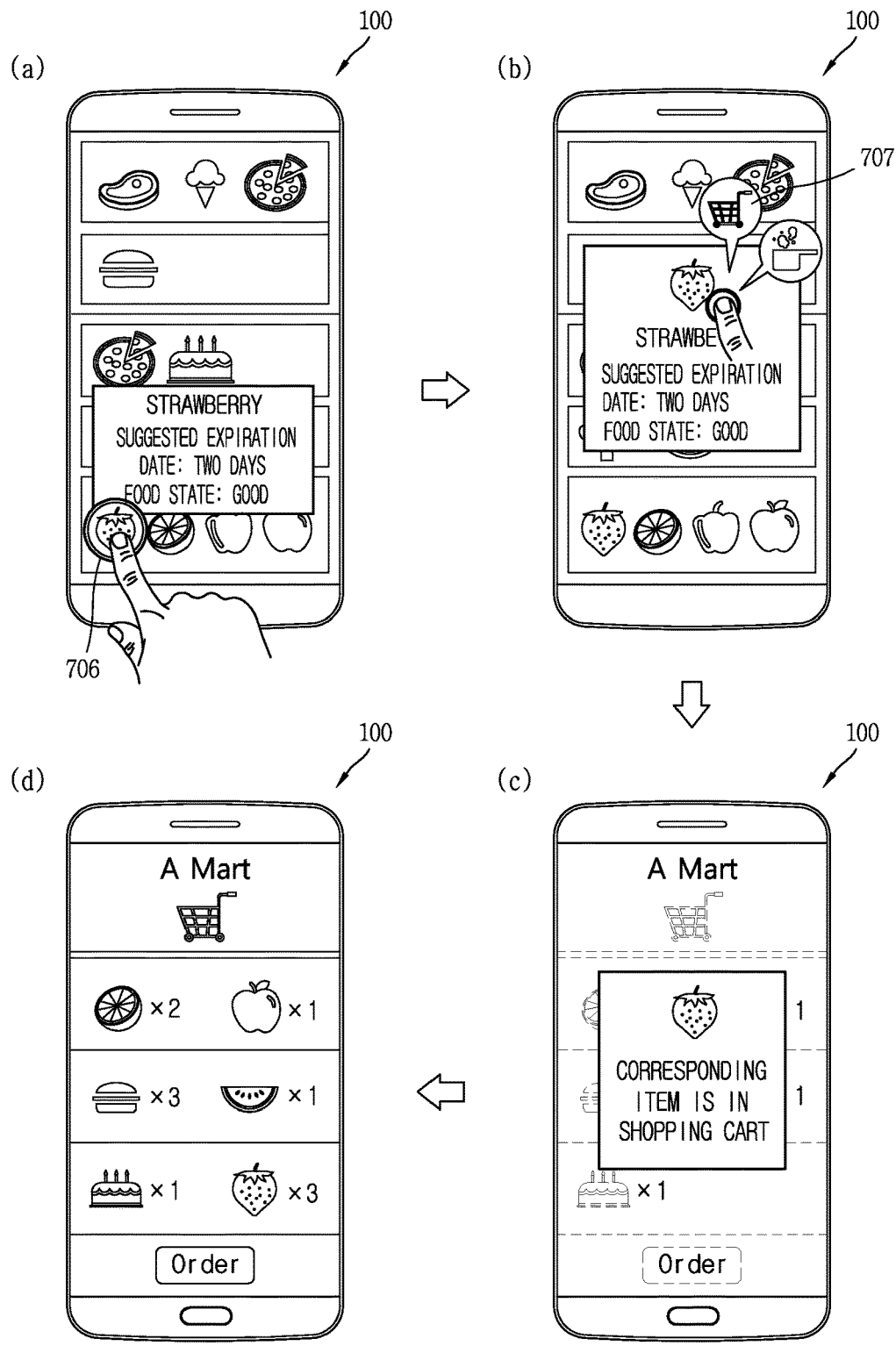

Hereinafter, a method for performing controlling related to an external device output on a mobile terminal using an appearance image of the external device will be described in detail with reference to the accompanying drawings. FIGS. 7A, 7B, and 7C are conceptual views illustrating a method for controlling an external device from a mobile terminal.

As discussed above, in the mobile terminal according to the present disclosure, an appearance image regarding a paired external device may be output on the touch screen, thereby informing the user that the mobile terminal is able to perform a function in relation to the current external device. Thus, in the mobile terminal according to the present disclosure, a function according to characteristics of each external device may be provided according to a type of a paired external device. In this case, the controller 180 may continuously exchange data with the external device to obtain or transmit data required for the executed function.

For example, in a case in which the external device is a refrigerator, when a touch is applied in a state in which an appearance image 701 of a paired external device (refrigerator) is output on the touch screen as illustrated in (a) and (b) of FIG. 7, the controller 180 may output information regarding materials stored in the refrigerator as illustrated in (c) of FIG. 7A.

Here, the touch may be set as a preset type, and for example, the touch may be a drag type touch. The preset type of touch may provide a lively user experience as if the user opens a door of the refrigerator.

Also, the controller 180 may provide different information according to a touched position. That is, different information may be provided according to which of appearance images corresponding to a refrigerating chamber door and a freezing chamber door is touched.

Here, the information regarding the material stored in the refrigerator may be received from the refrigerator, and in the refrigerator, the inside of the refrigerator may be imaged through a camera provided in the refrigerator and the imaged information may be transmitted to the mobile terminal 100.

In another example, when any one graphic object 703 of the output information is selected as illustrated in (a) of FIG. 7B, the controller 180 may output information (704) regarding the material corresponding to the selected graphic object 703 as illustrated in (b) of FIG. 7B.

Here, the information regarding the material may be information generated in the mobile terminal or information received from the external device (refrigerator). The controller 180 may receive material information stored in the refrigerator through an image from the external device (refrigerator) at a preset time interval, and analyze materials corresponding to the received image to generate data (an expiration date, a food state, recipe information, use frequency, and the like) regarding the materials.

In another example, when any one graphic object 706 is selected from output information as illustrated in (a) of FIG. 7C, the controller 180 may recommend a function related to a material corresponding to the selected graphic object 706 as illustrated in (b) of FIG. 7C. For example, the recommendation function may be a shopping function or a recipe output function. As illustrated, when an icon 707 corresponding to the shopping function is selected, the controller may execute a shopping-related application or may access a shopping-related page to perform a process of purchasing the corresponding material as illustrated in (c) and (d) of FIG. 7C.

Meanwhile, although not shown, in a case in which the external device is a washing machine, the controller may output an appearance image of the washing machine on the touch screen and provide an effect as if a door of the washing machine is opened, in response to a touch applied to any one of the front surface and the side surface of the touch screen. In this case, a washing stop command may be transmitted to the washing machine.

In addition, in a case in which the external device is a remote controller, touch keys having the same arrangement as a key arrangement of the remote controller may be output on the touch screen.

In another example, in a case in which the external device is a smart safe, a safe image and touch keys for disabling security of the safe may be output on the touch screen. In this case, when security information is input through the touch keys, security of the safe may be disabled. Also, in this case, information regarding an article kept in the safe may be output.

In another example, in a case in which the external device is a vehicle, a general screen of the mobile terminal, rather than an image of the external device, may be output on the front touch screen and event information or navigation information may be output on the rear touch screen, whereby a head-up display function may be performed. This case is on the premise that the mobile terminal is disposed in the vehicle.

In another example, in a case in which the external device is a bicycle, a general screen of the mobile terminal, rather than an image of the external device, may be output on a front surface, and a lighting function may be provided on a rear surface.

In another example, the external device may be a drone, a robot cleaner, a camera, a mouse, a game controller, a clock, an e-book holder, an airplane seat, and the like. In this case, the controller 180 may output an appearance image according to a type of an external device on the touch screen and output a function button provided in the external device in a form of a touch key on the touch screen, to allow the external device to be controlled by only the mobile terminal.

Figure 8B:
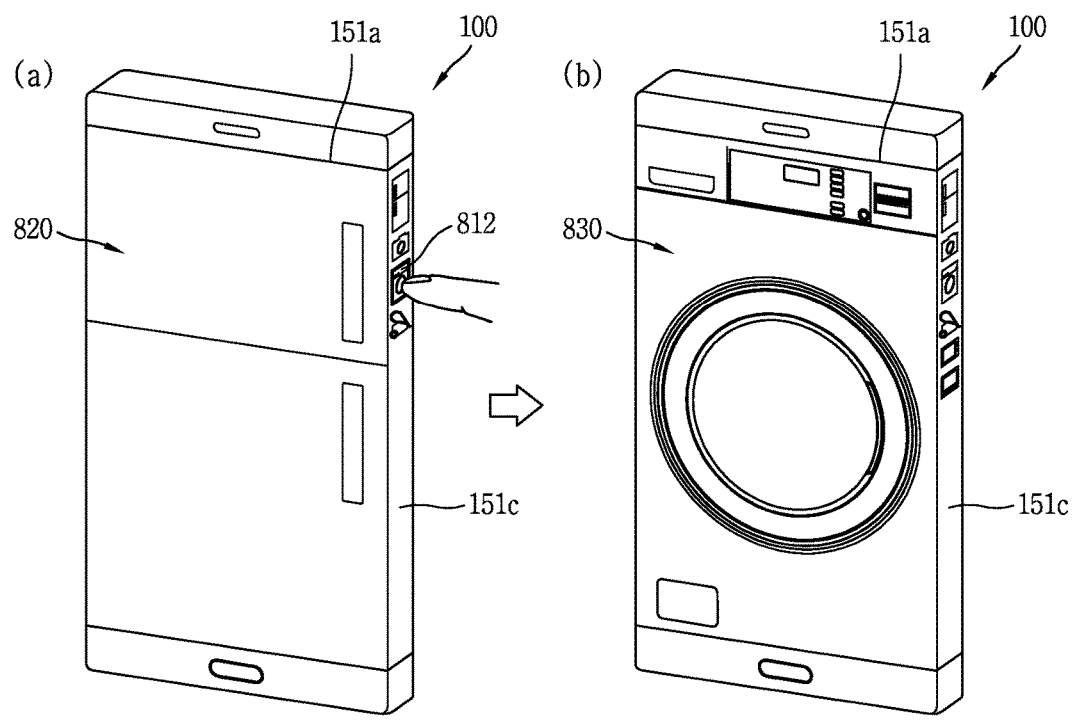

Hereinafter, a method for controlling a plurality of external devices when the mobile terminal is paired with the plurality of external devices will be described in detail with reference to the accompanying drawings. FIGS. 8A and 8B are conceptual views illustrating a method for controlling a plurality of external devices. The mobile terminal according to the present disclosure may be connected to a plurality of external devices. As illustrated in (a) of FIG. 8A, a connection target device may be various electronic devices (801, 802, 803). The user may select which of the plurality of electronic devices is to be controlled through an interface provided on the mobile terminal. Also, as illustrated, the user may image an electronic device (or an external device) desired to be controlled using the mobile terminal 100 through the camera 121 to thereby select a connection target device. The controller 180 may identify an electronic device (or external device) by analyzing a graphic object included in an image (which may be a preview image) input through the activated camera.

Also, the controller 180 may perform pairing through communication with three identified external device.

Also, although not shown, the controller 180 may select an external device having the strongest wireless signal strength with respect to the wireless communication unit, among the plurality of external devices, as a connection target device.

Also, although not shown, in a case in which a plurality of external devices are available to be connected, the controller 180 may perform pairing with an external device in which an event has occurred, and change an appearance of the touch screen to an appearance image of the event-generated external device.

In this manner, the appearance image of the selected external device (820) may be output on at least one of the front, side, and rear surfaces of the touch screen in various manners as illustrated in (b) of FIG. 8A.

Also, as illustrated in (b) of FIG. 8A, the controller 180 may output pieces of information of other connectable external devices than the external device corresponding to the appearance image currently output on the touch screen, in a form of an icon on a region (for example, the side touch screen area 151c) of the touch screen (810, 811, 812, 813 in (b) of FIG. 8A).

Also, when any one icon 812 (corresponding to a washing machine) is selected as illustrated in (a) of FIG. 8B, the controller may output an appearance image 830 of the external device corresponding to the selected icon on the touch screen as illustrated in (b) of FIG. 8B. In this case, a touch applied to the touch screen may be processed as a control command for controlling the external device corresponding to the selected icon.

According to the mobile terminal and the control method thereof according to the present disclosure described above, appearance information of an external device may be output on the touch screen extending from the front surface to the side and rear surfaces such that it is the same as or similar to an appearance of a paired external device. Thus, the user may easily recognize which external device is controlled through the information output through the mobile terminal.

Also, according to the mobile terminal and the control method thereof according to the present disclosure, a control key may be output to a position of the touch screen, which corresponds to a place where software or hardware key provided in an external device is positioned. Thus, the user may easily input a control command for controlling the external device on the basis of a user experience.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
 a main body having a front side, a lateral side, and a rear side;
 a display located at the front side and extending from the front side to be located at the lateral side;
 a memory;
 a camera;
 a wireless communication unit configured to be paired with an external device to communicate with the external device; and
 a controller configured to:
  activate the camera in response to pairing with the external device;

cause the display to display image capture guide information to capture an image of an appearance of the external device via the activated camera;

cause the camera to capture a first image corresponding to a front appearance of the external device and a second image corresponding to a side appearance of the external device based on a user input received according to the image capture guide information;

cause the display to display the first image on a front display area corresponding to the front side of the main body; and cause the display to display the second image on a side display area corresponding to the lateral side of the main body.

2. The mobile terminal of claim 1, wherein the controller is further configured to:

pair with a plurality of external devices via the wireless communication unit;

cause the display to display a plurality of icons, each corresponding to a different one of the paired plurality of external devices, the plurality of icons displayed on the side display area;

cause the display to display an image corresponding to an appearance of one of the paired plurality of external devices on the front display area when one of the plurality of icons corresponding to the one of the plurality of external devices is selected; and control the one of the plurality of external devices while the image corresponding to the appearance of the one of the plurality of devices is displayed on the front display area.

3. The mobile terminal of claim 2, wherein the plurality of external devices comprise an audio or speaker device, a video or display device, a refrigerator, and a washing machine.

4. The mobile terminal of claim 1, wherein:

the first and second images are associated with identification information of the external device and stored in the memory; and the controller is further configured to cause the display to display information on the front and side display areas of the display based on the first and second images stored in association with the identification information of the external device when re-pairing between the external device and the wireless communication unit is performed after termination of the pairing.

5. The mobile terminal of claim 1, wherein when the external device is recognized, the controller is further configured to search the memory for information regarding an appearance image of the external device, and when the information regarding the appearance image regarding the external device is not present, the controller is further configured to activate the camera and output the image capture guide information to capture the image of the appearance of the external device via the activated camera.

6. The mobile terminal of claim 1, wherein the controller is further configured to edit only a region corresponding to the external device using the first and second images.

7. The mobile terminal of claim 1, wherein the controller is further configured to cause the display to display a function icon for controlling the external device.

8. The mobile terminal of claim 7, wherein the function icon is displayed on a display area of the display corresponding to a side of the external device at which a function key corresponding to the function icon is located.

9. A method for controlling a mobile terminal comprising a main body having a front side, a lateral side, and a rear side, the method comprising:

communicating, via a wireless communication unit, to pair with an external device; and activating a camera in response to pairing with the external device;

causing a display to display image capture guide information to capture an image of an appearance of the external device via the activated camera;

causing the camera to capture a first image corresponding to a front appearance of the external device and a second image corresponding to a side appearance of the external device based on a user input received according to the image capture guide information;

causing the display to display the first image on a front display area corresponding to the front side of the main body; and causing the display to display the second image on a side display area corresponding to the lateral side of the main body.

* * * * *